D. J. ANGUS.
ELECTRIC METER CONSTRUCTION.
APPLICATION FILED MAY 20, 1918.

1,394,528.

Patented Oct. 25, 1921.
2 SHEETS—SHEET 1.

Witness
Frank A. Fahle

Inventor
Donald J. Angus,
By
Hood & Schley,
Attorneys

D. J. ANGUS.
ELECTRIC METER CONSTRUCTION.
APPLICATION FILED MAY 20, 1918.
1,394,528. Patented Oct. 25, 1921.
2 SHEETS—SHEET 2.
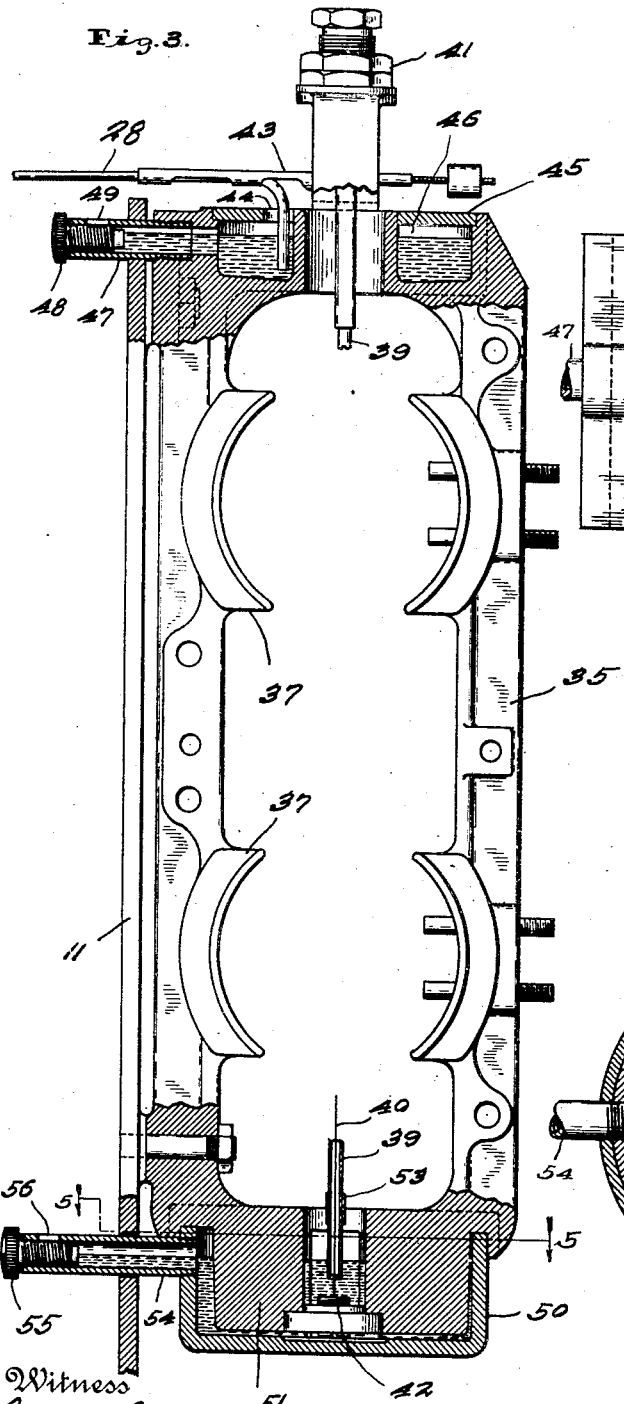
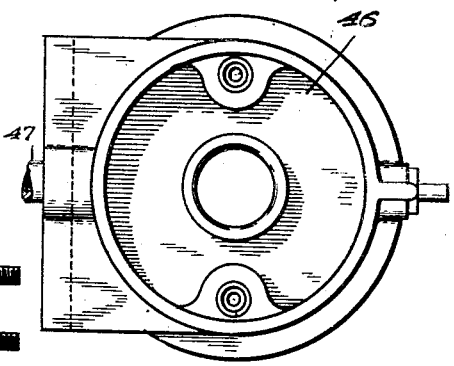
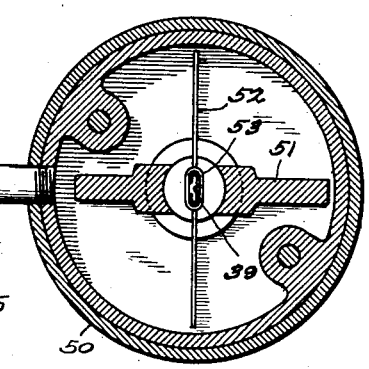
Inventor
Donald J. Angus,
By
Hood &Schley.
Attorney
Witness
Frank A. Fable

UNITED STATES PATENT OFFICE.

DONALD JAMES ANGUS, OF INDIANAPOLIS, INDIANA.

ELECTRIC-METER CONSTRUCTION.

1,394,528.   Specification of Letters Patent.   Patented Oct. 25, 1921.

Application filed May 20, 1918. Serial No. 235,573.

*To all whom it may concern:*

Be it known that I, DONALD J. ANGUS, a citizen of the United States, residing at Indianapolis, in the county of Marion and State of Indiana, have invented a new and useful Electric-Meter Construction, of which the following is a specification.

It is the object of my present invention to provide a recording meter arrangement of increased efficiency and convenience: wherein the metering parts and the record and record-making parts are in separate compartments; the metering parts are normally concealed but easily accessible; the record and record-making parts are visible and also easily accessible; the metering parts have associated therewith certain liquid chambers, as for ink and for damping fluid, which are provided with filling tubes extending into the record compartment so as to permit filling from that compartment, so that in case of overflow the overflowing liquid will not be in the compartment containing the metering parts; and the metering parts are in a unitary frame, in which the ink chamber is provided.

The present invention relates only to the general arrangement of parts and to the stationary parts. The structure and mounting of the movable element of the meter form the subject-matter of my co-pending applications Ser. Nos. 235,572 and 235,574 of even filing date herewith.

Figure 2:
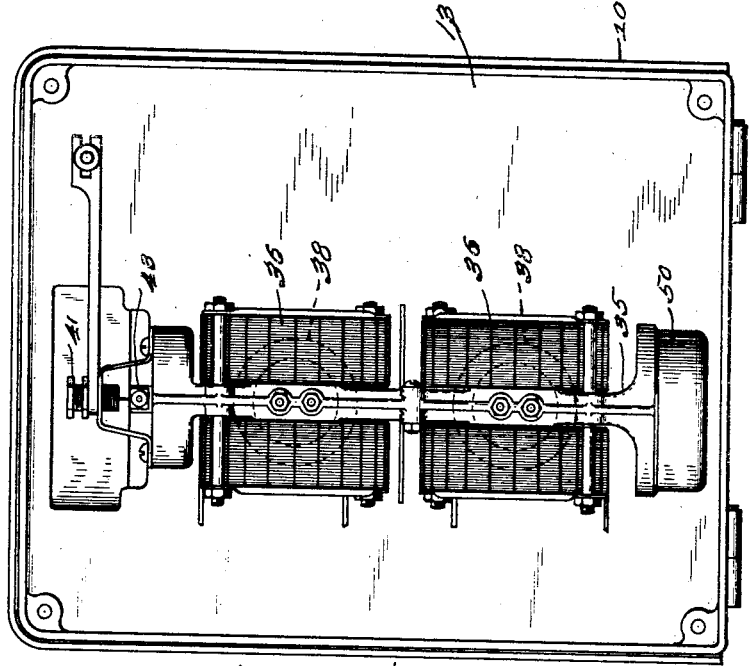
Figure 1:
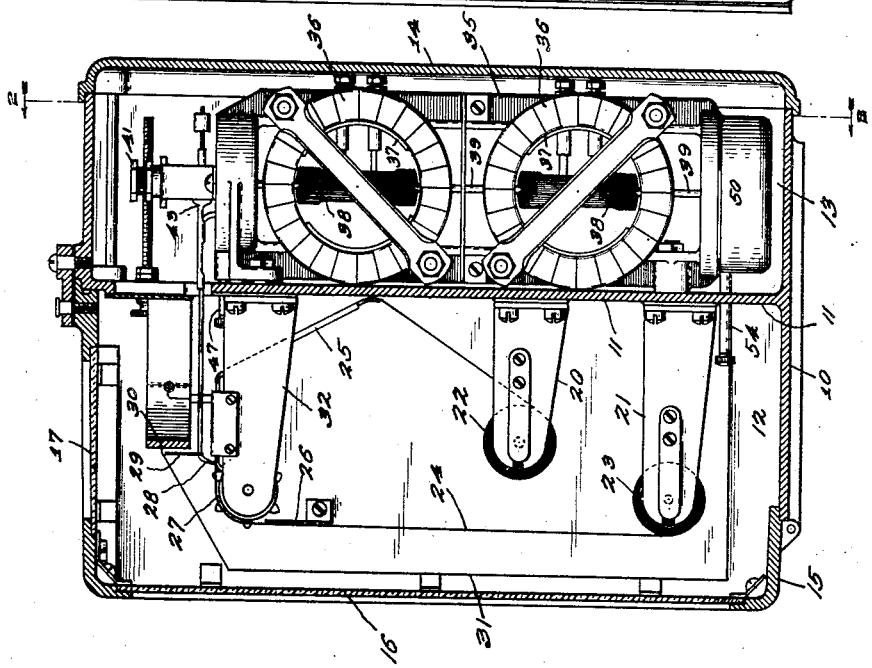

The accompanying drawings illustrate my invention as applied to an electric meter. Figure 1 is a vertical section through an electric meter embodying my invention; Fig. 2 is a vertical section on the line 2—2 of Fig. 1; Fig. 3 is a partial section and partial elevation on a larger scale, showing the stationary frame and its mounting on the central partition, and the liquid compartments and their filling tubes; Fig. 4 is a plan of the frame shown in Fig. 3, with the cover of the ink chamber removed; and Fig. 5 is a section on the line 5—5 of Fig. 3.

The main casing 10 of the meter is divided by a vertical partition 11 into a front compartment 12 containing the record-making parts and a rear compartment 13 containing the metering parts. The metering parts and the record-making parts are all supported on the partition 11. The rear compartment 13 is closed by a removable back 14; and the front compartment 12 is closed by a hinged front cover plate 15 which forms the front, sides, and top of such compartment and has windows 16 and 17 of glass or other suitable transparent material in front and top.

Suitably mounted in the front compartment 12 on the partition 11 are two roll brackets 20 and 21, which carry the supply roll 22 and the winding roll 23 of a record sheet 24. This record sheet passes over suitable guides 25 and 26 and a feed roller 27, so that it has a horizontal portion visible through the top window 17 and on which the record is made by a pen 28, and a vertical portion on which the most recently made part of the record is visible through the front window 16. The pen 28 carries a pointer 29 which moves over an indicating scale 30, so that visual indication of the instantaneous condition being measured is given. The record sheet is driven in any suitable manner, as by clockwork, preferably inclosed in a casing 31 mounted on the partition 11 within the compartment 12. This driving means operates the winding roll 23 and the feed roller 27, in any suitable manner. The guides 25 and 26 and the feed roller 27 are preferably supported from the partition 11, as by being mounted either on the clockwork casing 31 or on a bracket 32 projecting forward from such partition.

Mounted within the compartment 13 on the partition 11 is the stationary non-magnetic frame 35 of the metering parts of the meter. This frame is of unitary construction, as best shown in Fig. 3, and in the electric meter shown carries in any suitable manner the stationary coils 36 which produce the desired magnetic field. A movable element having suitably connected coils 38 mounted on a staff 39 carried by a torsion wire 40 supported in its upper and lower ends in suitable supports 41 and 42 on the frame 35 coöperates with the stationary element formed by such frame and the stationary coils 36. The manner of this coöperation forms no part of the present invention, and neither does the structure and mounting of the movable element, as already stated, so that such movable element has been almost wholly omitted from the showing in Fig. 3.

The pen 28 is carried by a clip 43 suitably mounted on the staff 39 of the movable element, the precise mounting of such pen forming part of the subject-matter of my aforesaid co-pending application Ser. No.

235,572, and near such staff 39 the pen 28 is bent downward to pass through an arc-shaped slot 44 in the cover 45 of an ink well 46 and into the ink in such well. The ink is fed from the ink well through the pen by capillary action. The ink well 46 is formed as a cup in the integral upper end of the frame 35. It is provided with a filling tube 47 which passes from such well through the frame 35 and the partition 11 into the compartment 12. The outer end of the filling tube 47 is closed by a screw 48 and is provided on its upper side with a filling opening 49 through which the ink well 46 may be filled. The filling opening 49 is lower than the top of the ink chamber 46, so that in case of overflow the overflow will be in the compartment 12 and not in the compartment 13.

Attached to the bottom of the frame 35 is a cup 50, into which a stationary partition 51 from the frame 35 and a paddle 52 carried by a clip 53 on the lower end of the tube 39 extend downward. The cup 50 contains oil or other damping fluid, which reacts on the paddle 52 to produce the desired damping effect. The cup 50 is provided with a filling tube 54 extending therefrom through the partition 11 similarly to the filling tube 47 of the ink chamber, the filling tube 54 being provided with a screw 55 in its outer end and a filling opening 56 on its upper side in the chamber 12, and such filling opening 56 being lower than the top of the cup 50, so that the cup 50 may be filled from the compartment 12 and any overflow will be in the compartment 12.

In operation, the movable element moves upon variations in the thing being measured, and as it moves is damped by the reaction of the paddle 52 and the oil in the cup 50. Also, the movements of the movable element cause corresponding movements of the pen 28, so that it makes a record on the record sheet 24 which is being moved by the clockwork within the casing 31.

I claim as my invention:

1. A meter, comprising a casing having a partition dividing it into front and rear compartments, stationary and movable meter elements mounted in said rear compartment, a record sheet and means for moving it mounted in said front compartment, a marking device coöperating with said record sheet and controlled by said movable meter element, a liquid chamber associated with said meter elements in said rear compartment, and a filling tube extending from said liquid chamber through said partition into said front compartment, and there being provided with a filling opening at a lower level than the top of said liquid chamber.

2. A meter, comprising a casing having a partition dividing it into front and rear compartments, stationary and movable meter elements mounted in said rear compartment, a record sheet and means for moving it mounted in said front compartment, a marking device coöperating with said record sheet and controlled by said movable meter element, a liquid chamber associated with said meter elements in said rear compartment, and a filling tube extending from said liquid chamber through said partition into said front compartment and there being provided with a filling opening.

3. A meter, comprising a casing having a partition dividing it into front and rear compartments, stationary and movable meter elements mounted in said rear compartment, a record sheet and means for moving it mounted in said front compartment, a marking device coöperating with said record sheet and controlled by said movable meter element, a removable back for said rear compartment, and a hinged cover for said front compartment, said last-named hinged cover forming the front, side walls, and top of said front compartment and being provided with a window through which the record sheet is visible.

4. A meter, comprising a casing having a partition dividing it into front and rear compartments, stationary and movable meter elements mounted in said rear compartment, a record sheet and means for moving it mounted in said front compartment, a marking device coöperating with said record sheet and controlled by said movable meter element, a removable back for said rear compartment, and a hinged cover for said front compartment, said last-named hinged cover forming the front, side walls, and top of said front compartment.

5. In a meter, the combination of a stationary meter element, a movable meter element coöperating with said stationary meter element, said stationary meter element having a portion formed into a cup for containing ink, a pen controlled by said movable meter element and projecting into said cup, and a filling tube communicating with said cup and having a filling opening at a point below the top of the cup.

6. In a meter, the combination of a stationary meter element, a movable meter element coöperating with said stationary meter element, said stationary meter element having a portion formed into a cup for containing ink, and a pen controlled by said movable meter element and projecting into said cup.

7. In a meter, the combination of a stationary meter element, a movable meter element coöperating with said stationary meter element, a liquid-containing cup at the lower end of said stationary meter element, a paddle mounted on said movable meter element and extending downward into said cup to provide a damping device, and a filling tube communicating with said cup and having a filling opening at a point below the top of the cup.

8. In a meter, the combination of a stationary meter element, a movable meter element coöperating with said stationary meter element, a liquid-containing cup at the lower end of said stationary meter element, a paddle mounted on said movable meter element and extending downward into said cup to provide a damping device, and a stationary partition carried by said stationary meter element and projecting downward into said cup to increase the damping action.

9. A meter, comprising stationary and movable elements, a record sheet, a pen coöperating with said record sheet and controlled by said movable element, and an ink well integral with the stationary element and supplying said pen.

10. A meter, comprising stationary and movable elements, and a liquid chamber integral with said stationary element.

11. In a meter, the combination of a stationary meter element, a movable meter element coöperating with said stationary meter element, said stationary meter element having a portion formed into a cup for containing ink, a pen controlled by said movable meter element and projecting into said cup, and a filling tube communicating with said cup.

12. In a meter, the combination of a stationary meter element, a movable meter element coöperating with said stationary meter element and movable about a substantially vertical axis, a liquid-containing cup at the lower end of said stationary meter element, and a paddle mounted on said movable meter element across the axis thereof and extending downward into said cup to provide a damping device.

In witness whereof I have hereunto set my hand at Indianapolis, Indiana, this 15th day of May, A. D. one thousand nine hundred and eighteen.

DONALD JAMES ANGUS.

Witnesses:
J. W. Murphy,
R. E. Kennedy.